(12) United States Patent
Banikazemi et al.

(10) Patent No.: US 9,003,228 B2
(45) Date of Patent: Apr. 7, 2015

(54) CONSISTENCY OF DATA IN PERSISTENT MEMORY

(71) Applicant: International Business Machines Corporation, Armonk, NY (US)

(72) Inventors: Mohammad Banikazemi, New York, NY (US); Bulent Abali, Tenafly, NJ (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 13/708,165

(22) Filed: Dec. 7, 2012

(65) Prior Publication Data

US 2014/0164828 A1    Jun. 12, 2014

(51) Int. Cl.
G06F 11/00    (2006.01)
G06F 11/14    (2006.01)
G06F 9/46     (2006.01)

(52) U.S. Cl.
CPC ............ *G06F 11/1471* (2013.01); *G06F 9/466* (2013.01); *G06F 2201/82* (2013.01)

(58) Field of Classification Search
CPC ............ G06F 11/1412; G06F 11/1446; G06F 11/1471; G06F 11/1474; G06F 2201/84; G06F 2201/87; G06F 2201/885
USPC .................. 714/15–21, 48, 52; 707/674–704
See application file for complete search history.

(56) References Cited

U.S. PATENT DOCUMENTS

| | | | |
|---|---|---|---|
| 5,469,562 A | 11/1995 | Saether | |
| 5,701,480 A | 12/1997 | Raz | |
| 5,870,763 A | 2/1999 | Lomet | |
| 6,772,296 B1 | 8/2004 | Mathiske | |
| 6,851,021 B2 | 2/2005 | Iyengar et al. | |
| 7,269,608 B2 | 9/2007 | Wong et al. | |
| 7,383,290 B2 | 6/2008 | Mehra et al. | |
| 7,752,180 B1 * | 7/2010 | Fair et al. ...................... | 707/690 |
| 8,121,977 B2 | 2/2012 | Atluri et al. | |
| 8,285,758 B1 | 10/2012 | Bono et al. | |
| 2005/0203974 A1 | 9/2005 | Smith et al. | |
| 2006/0095447 A1 | 5/2006 | Dickinson et al. | |
| 2009/0150599 A1 | 6/2009 | Bennett | |
| 2010/0106734 A1 | 4/2010 | Calder et al. | |
| 2011/0161296 A1 | 6/2011 | Kaczmarski et al. | |
| 2011/0246503 A1 | 10/2011 | Bender et al. | |

(Continued)

OTHER PUBLICATIONS

M. Banikazemi et al.; "Eucalyptus: Support for Effective Use of Persistent Memory;" Parallel and Distributed Processing Sysmposium Workshops & PhD Forum (IPDPSW), 2012 IEEE 26th International; pp. 1152-1159.

(Continued)

*Primary Examiner* — Bryce Bonzo
*Assistant Examiner* — Anthony J Amoroso
(74) *Attorney, Agent, or Firm* — Cantor Colburn LLP

(57) ABSTRACT

Consistency of data stored in persistent memory is maintained using separate commit and harden operations for a transaction. A transaction is committed with a processing device, the committing including marking an end of an atomic operation on a modified object from the transaction, creating a new copy of the modified object, and storing a mapping of the modified object to the new copy of the modified object in a recorded log. A checksum identifying the modified object is created and stored in the recorded log. The transaction is hardened by storing the modified object and the recorded log from cache into persistent memory.

22 Claims, 6 Drawing Sheets

(56) References Cited

U.S. PATENT DOCUMENTS

| | | |
|---|---|---|
| 2011/0259816 A1 | 10/2011 | Yokota et al. |
| 2012/0109895 A1 | 5/2012 | Zwilling et al. |
| 2012/0117419 A1 | 5/2012 | Hillman et al. |
| 2012/0272240 A1 | 10/2012 | Starks et al. |

OTHER PUBLICATIONS

International Search Report and Written Opinion for International Applciation No. PCT/US13/55914; International Filing Date: Aug. 21, 2013; Date of Mailing: Mar. 21, 2014, 16 pages.

Guerra et al, "Software Persistent Memory", Proceedings of the USENIX Annual Technical Conf., Jun. 2012, pp. 1-13.

* cited by examiner

CONSISTENCY OF DATA IN PERSISTENT MEMORY

BACKGROUND

The present invention relates to persistent memory, and more specifically, to maintaining the consistency of data stored in persistent memory by separating the committing and hardening of data in volatile caches.

Persistent main memory preserves its contents in the absence of power, whereas conventional dynamic random-access memory and processor caches are volatile memories which lose their contents in the absence of power. Consistency means that the memory operations are ordered and atomic even in the event of a mid-operation power failure. A program running on a central processing unit (CPU) expects that its writes to the memory is made persistent in the same order as the write order, and that a data object being written is made persistent either as a whole or not made persistent at all.

With the emergence of persistent main memory, in memory data structures can be treated as persistent at even the object granularity. Moreover, the nonvolatility of data stored in persistent memory can provide advantages over contemporary dynamic random-access memory (DRAM) such as higher capacity, lower cost, and access to persistent storage. However, a challenge in integrating persistent memory technologies with a contemporary memory hierarchy arises because lower levels of the memory hierarchy, such as various levels of caches, are non-persistent and volatile.

SUMMARY

According to an embodiment, a computer-implemented method is provided for maintaining consistency of data stored in persistent memory. A transaction in cache is committed with a processing device, the committing including marking an end of an atomic operation on a modified object from the transaction, creating a new copy of the modified object, and storing a mapping of the modified object to the new copy of the modified object in a recorded log. A checksum identifying the modified object is created and stored in the recorded log. The modified object and the recorded log from cache are stored into persistent memory during a hardening of the transaction.

According to another embodiment, a computer system including a processor, a system memory, and a bus that couples various system components including the system memory to the processor, is provided for maintaining consistency of data stored in persistent memory. A transaction in cache is committed with a processing device, the committing including marking an end of an atomic operation on a modified object from the transaction, creating a new copy of the modified object, and storing a mapping of the modified object to the new copy of the modified object in a recorded log. A checksum identifying the modified object is created and stored in the recorded log. The modified object and the recorded log from cache are stored into persistent memory during a hardening of the transaction.

According to another embodiment, a computer program product including a computer readable storage medium having computer readable program code stored thereon that, when executed, performs a method, is provided for maintaining consistency of data stored in persistent memory. A transaction in cache is committed with a processing device, the committing including marking an end of an atomic operation on a modified object from the transaction, creating a new copy of the modified object, and storing a mapping of the modified object to the new copy of the modified object in a recorded log. A checksum identifying the modified object is created and stored in the recorded log. The modified object and the recorded log from cache are stored into persistent memory during a hardening of the transaction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein provide for the consistency of data in persistent memory in the presence of volatile caches and buffers where data may reside at the time of system failure such as when power is lost. Several technologies in the contemporary art provide persistent memory. However, none of these technologies deal with the consistency of data stored in these memories. Embodiments described herein provide consistency of data stored in these persistent memories.

Since the caches in persistent memories are volatile, there is no guarantee that data in the volatile caches will reach the persistent memory at the time of a system failure. Moreover, contemporary memory hierarchies, which typically include main memory and one or more levels of cache, have been designed to act as one single unit. As a result, software processes have no explicit control as to where in the memory hierarchy their data is stored. Since modified data can reach the persistent memory in any order, in the case of system failures, only modifications that have already reached the persistent memory are preserved and the rest of the modifications are lost. Accordingly, there is no enforcement of ordering with respect to a specific level in the memory hierarchy or safeguard with respect to atomicity of memory accesses to a specific level in the memory hierarchy after a system failure.

Embodiments disclosed herein modify data objects atomically. A new version of each modified object is created and a log of relevant object identifiers for the modified object is maintained for a given atomic operation to provide for consistency of data in persistent memory. Embodiments create and log a checksum of modified objects to validate the content in memory after a system failure.

Moreover, embodiments do not force data out of the cache and into persistent memory during each commit operation. Modified data in a cache can reach the persistent memory in any order and independent of other modified data. After recovering from a system failure, embodiments detect any modification to an object that place the content of persistent memory in a non-consistent state and nullify them.

Figure 1:
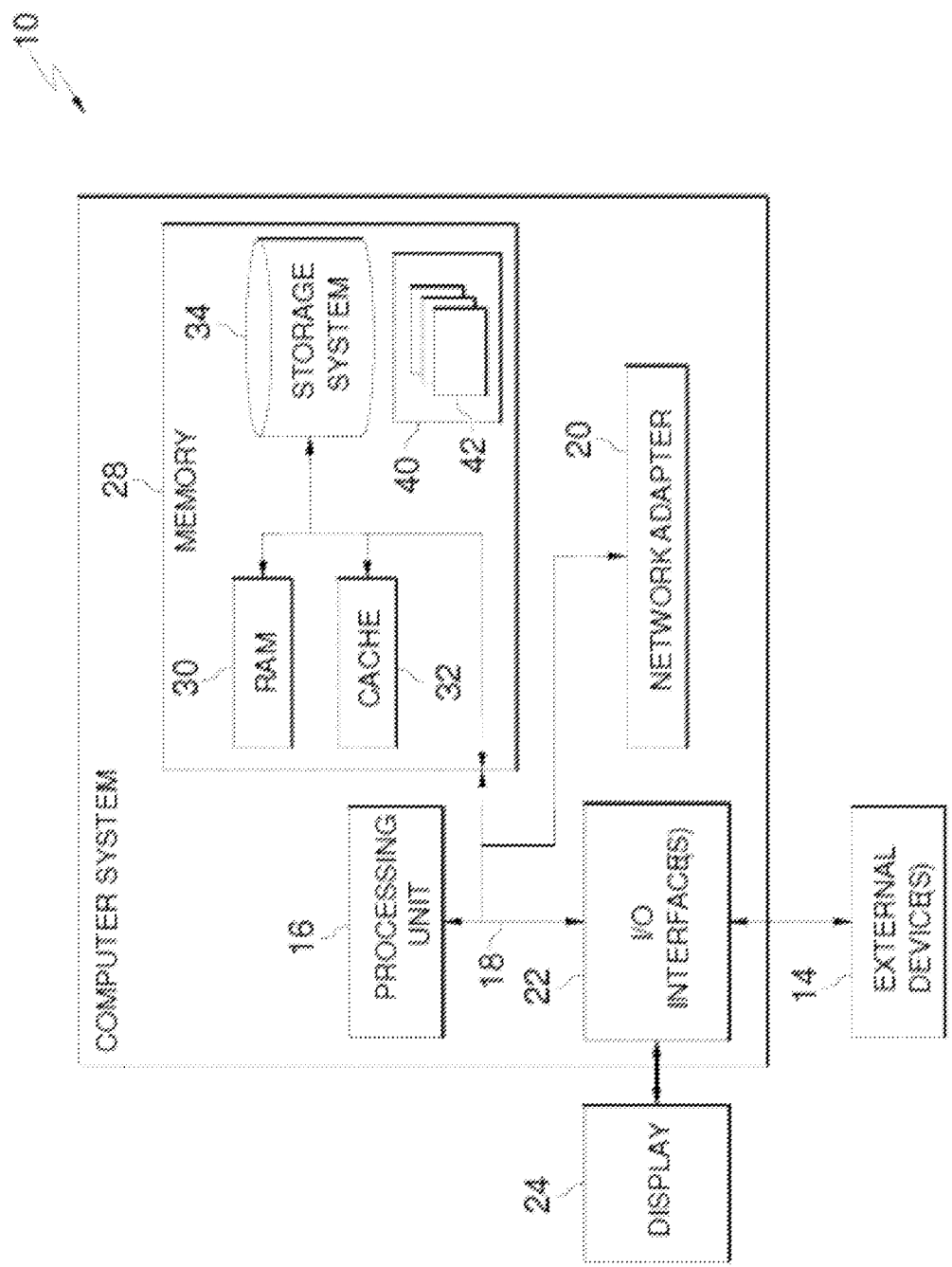
FIG. 1 depicts a block diagram of a computer system according to an embodiment.

Referring now to FIG. 1, a block diagram of a computer system 10 suitable for maintaining the consistency of data stored in persistent memory according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
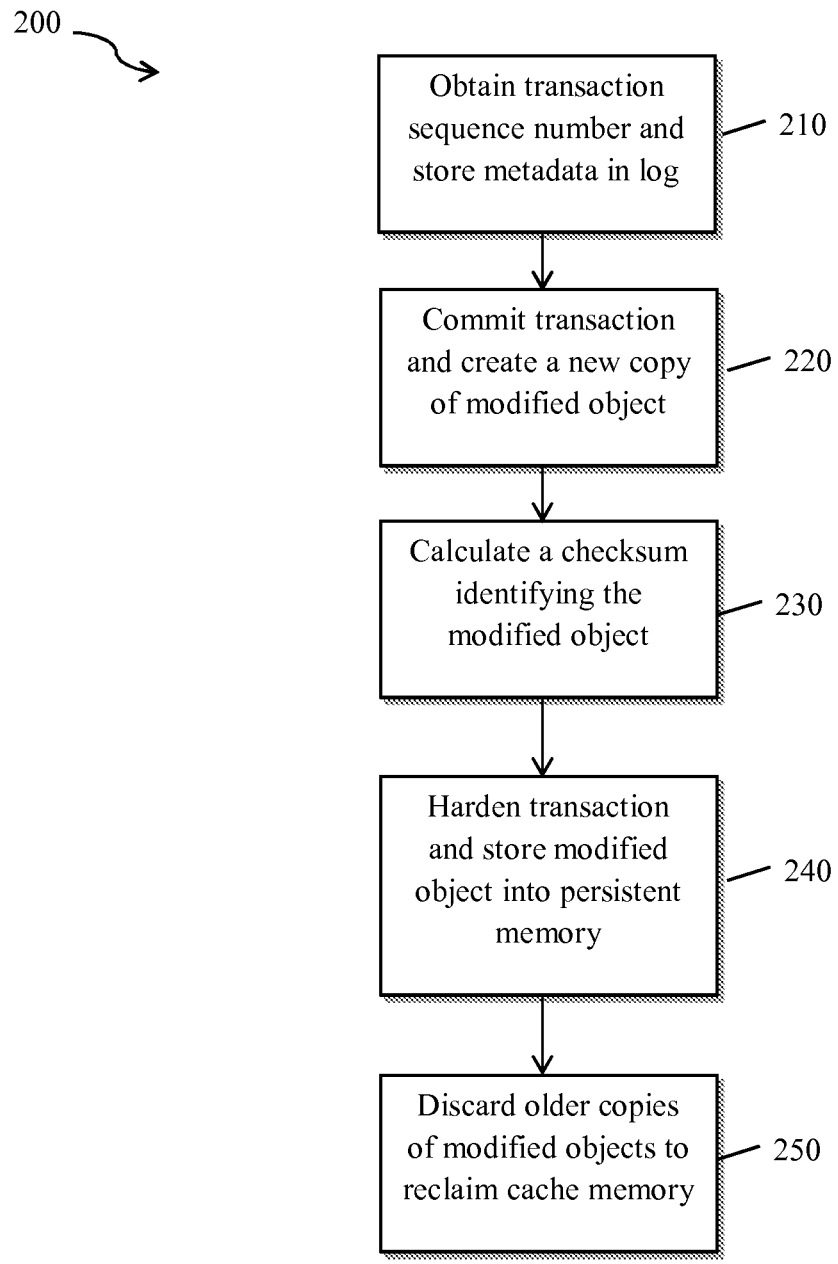
FIG. 2 depicts a flow diagram of a transaction operation for maintaining the consistency of data stored in persistent memory by separating the committing and hardening of data in volatile caches according to an embodiment.

FIG. 2 illustrates a flow diagram of a transaction operation 200 for maintaining the consistency of data stored in persistent memory by separating the committing and hardening of data in volatile caches according to an embodiment. An embodiment of the transaction operation 200 is performed by the processing unit 16.

The transaction of an embodiment is a set of write operations to an object set. The object set includes one or more objects that are modified atomically to preserve consistency of data in the persistent storage memory. In block 210, a global sequence number or timestamp is obtained and associated with the transaction. The sequence number is used to enforce the ordering of atomic operations and is obtained from a single agent for each application. The sequence number and object identifiers for the object set associated with the transaction are recorded in a log and stored in persistent memory.

In an embodiment, a modification of an object from the object set results in the creation of a new version or copy of the object using a known technique such as, but not limited to, copy-on-write (COW). As shown in block 220, a commit operation marks an end of an atomic operation on the modified object and creates a new version of the modified object. The new version of the modified object is assigned a version identifier that is recorded in a log. All subsequent modifications to the object are made to the new version so that an older version of the object may be recoverable after a system failure.

Figure 3:
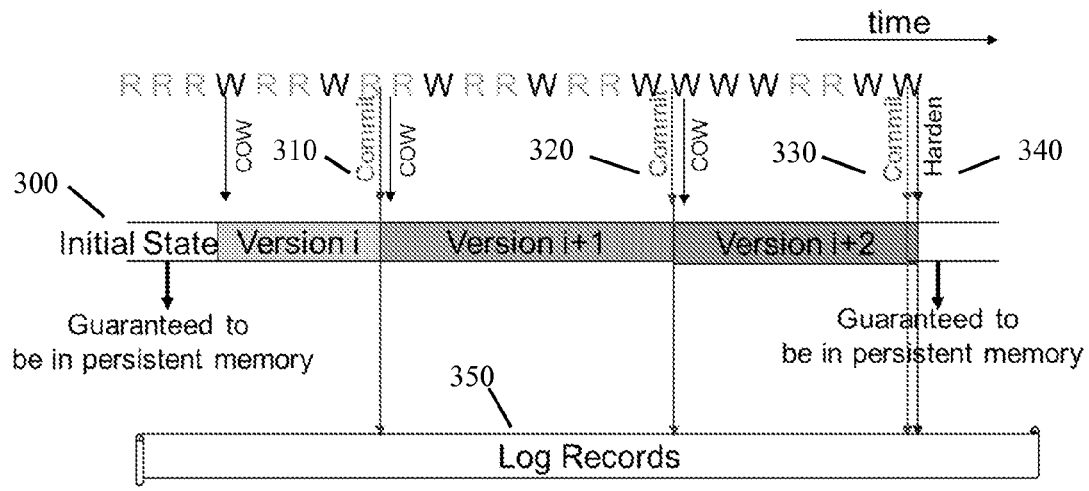
FIG. 3 depicts a creation of new versions of an object at the time of each commit operation according to an embodiment.

According to an embodiment illustrated in FIG. 3, the creation of new versions of an object 300 may occur at the time of each commit operation 310, 320, 330. As shown by the sequence of read (R) and write (W) operations to the object 300 in FIG. 3, a first commit operation 310 results in the creation of version i+1 of the object 300, a second commit operation 320 results in the creation of version i+2 of the object 300, and a third commit operation 330 results in the creation of another version of the object 300 at the approximate time of a hardening operation 340. The mapping of the object 300 to each new version is recorded in a log 350.

Figure 4:
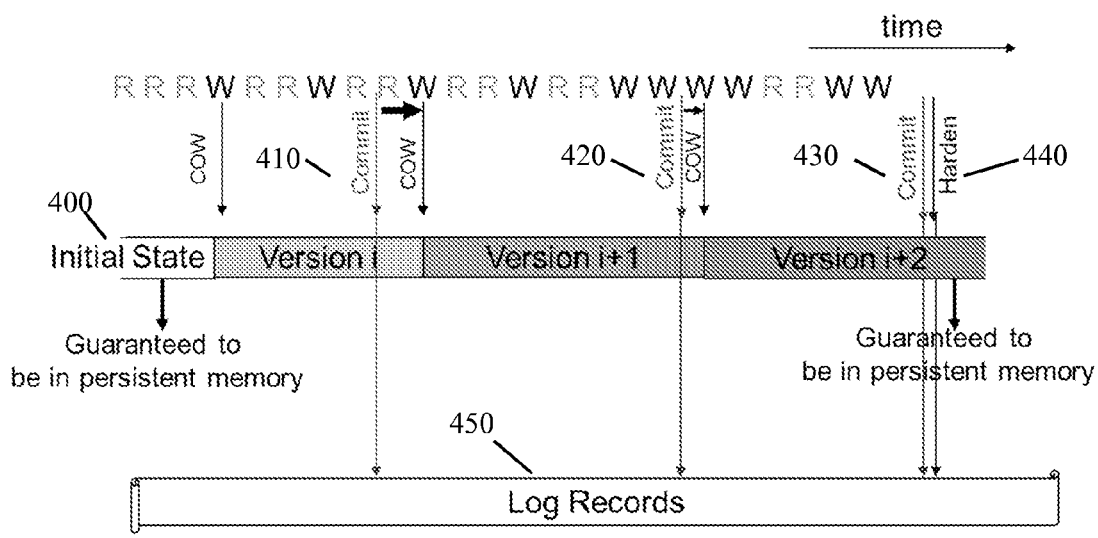
FIG. 4 depicts a delayed creation of new versions of an object until the next modification to the object according to an embodiment.

According to an alternative embodiment illustrated in FIG. 4, commit operations 410, 420, 430 may only mark an object 400 as COW and delay the creation of a new version until the next modification to the object 400. As shown in FIG. 4, a first commit operation 410 delays the creation of version i+1 of the object 400 until the next write operation, a second commit operation 420 delays the creation of version i+2 of the object 400 until the next write operation, and a third commit operation 430 delays the creation of another version of the object 400 until the next write operation after the harden operation 440. Similar to the embodiment of FIG. 3, the mapping of the object 400 to each new version is recorded in a log 450.

Referring back to FIG. 2, a checksum identifying the modified object is calculated and recorded in a log as shown in block 230. The checksum may be calculated at the time of the commit operation, or alternatively, in order to minimize the effect on performance, the checksum may be calculated and stored in persistent memory at the time of a harden operation.

In block 240, the harden operation forces all changes to the modified object to be stored in persistent memory by flushing the modified object and its associated log from the volatile caches to the persistent memory. After performing the transaction harden operation, the modified object and its associated log, which includes the checksum, are guaranteed to be stored in persistent memory in a consistent manner.

The sequence number associated with the transaction is used to enforce ordering by hardening transactions in order of their sequence numbers. This ordering operation of an embodiment may be optimized to lessen the number of copies that are hardened. In block 250, once all objects belonging to a set have been hardened at a certain point in time, all older copies of objects that have not been hardened yet and have smaller associated sequence numbers are discarded and the memory they used is reclaimed.

Figure 5:
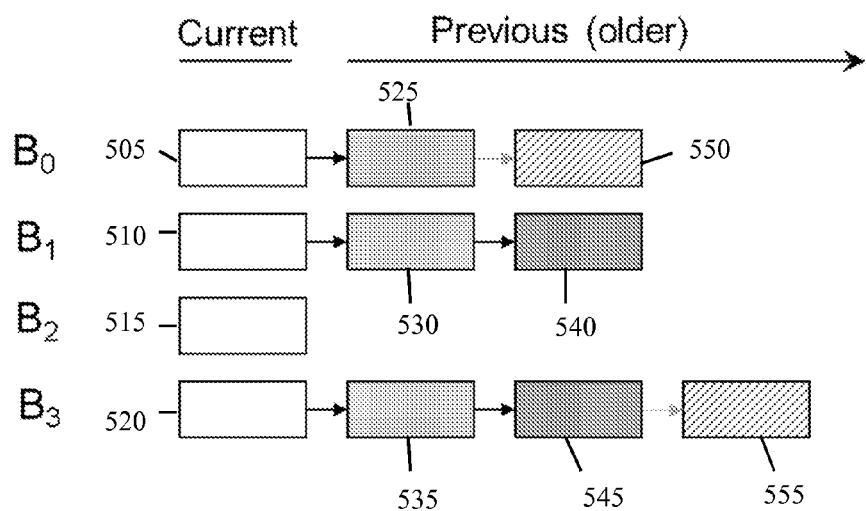
FIG. 5 depicts copies of modified objects of a transaction after a number of commits according to an embodiment.

FIG. 5 illustrates an embodiment of objects $B_0$, $B_1$, $B_2$, and $B_3$ after a number of commits. The white blocks 505, 510, 515, 520 represent current copies of respective objects $B_0$, $B_1$, $B_2$, and $B_3$. The solid gray blocks 525, 530, 535, 540, 545 represent committed copies of respective objects $B_0$, $B_1$, and $B_3$ that may be in persistent memory, but are not guaranteed to be in persistent memory. The striped blocks 550, 555 represent hardened copies of respective objects $B_0$ and $B_3$ that are guaranteed to be in persistent memory. Accordingly, copies older than a hardened copy of an object may be discarded to free space.

Figure 6:
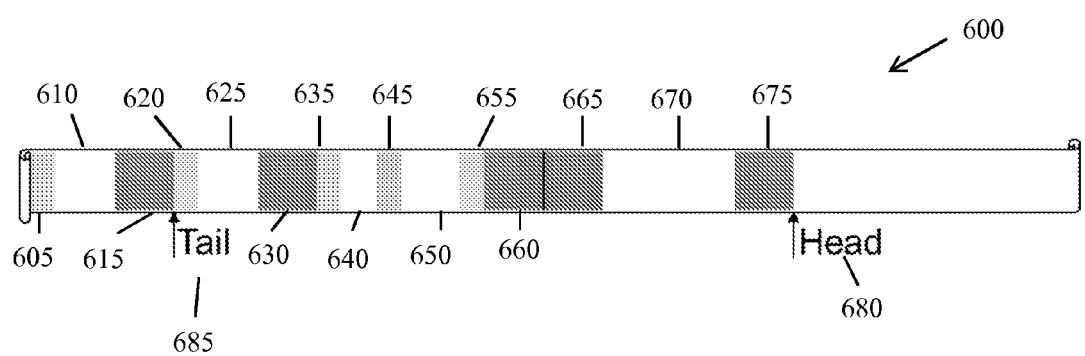
FIG. 6 depicts a log comprising headers, bodies, and trailers according to an embodiment.

FIG. 6 illustrates an embodiment of a log 600 with three parts including headers 605, 620, 635, 645, 655 for storing sequence numbers and identifiers for modified objects, bodies 610, 625, 640, 650, 670 for storing sequence numbers and lists of modified objects, and trailers 615, 630, 660, 665, 675 for storing sequence numbers and checksums. In an embodiment, logs from different transactions may be interleaved.

The log 600 can be implemented as a circular buffer wherein when log entries become obsolete, their space is reclaimed. A log head pointer 680 always points to where the next log record will be written. The log tail pointer 685 points to the oldest record that cannot be discarded and reclaimed. An embodiment may have multiple logs for avoiding hot spot log buffers. Moreover, an embodiment of the log can be asynchronously written to hard drives (local or remote) or sent to other nodes.

Figure 7:
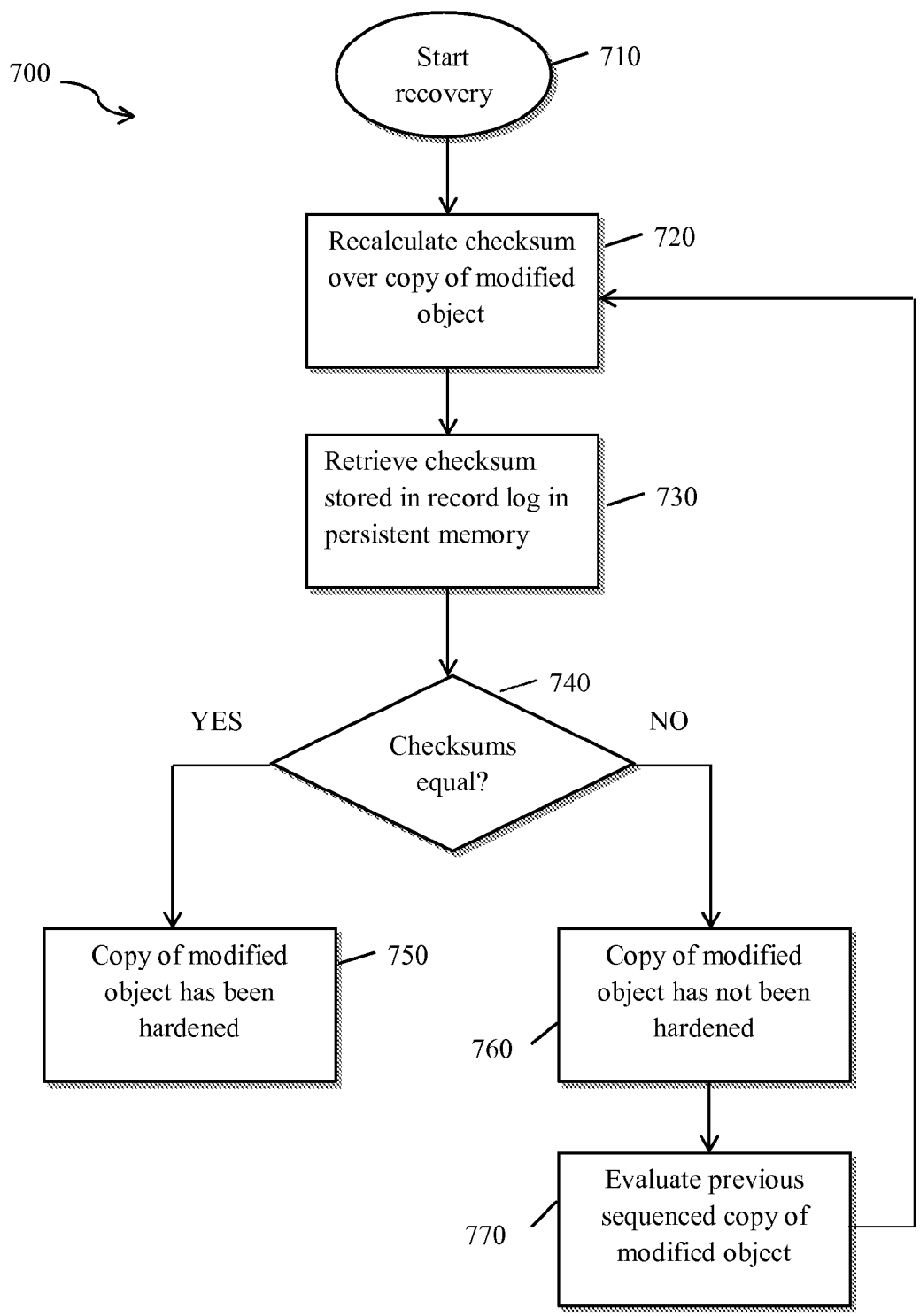
FIG. 7 depicts a flow diagram of a recovery operation for establishing a recovery point after a system failure according to an embodiment.

FIG. 7 illustrates a flow diagram of a recovery operation 700 for establishing a recovery point after a system failure, according to an embodiment. The recovery operation 700 guarantees that data in persistent memory is in a consistent state.

In block 710, the recovery operation 700 is triggered by a system failure. In the event of a system failure, the checksum for each transaction can be recalculated over a corresponding copy of a modified object and its associated log, as shown in block 720. The modified object and its associated log including the checksum may be previously stored in persistent memory to ensure that a set of changes made by a transaction was atomically executed. Accordingly, in block 730, the checksum stored in persistent memory is retrieved. In block 740, the recalculated checksum is compared with the checksum stored in persistent memory.

If the recalculated checksum and the checksum stored in persistent memory are equal, then the copy of the modified object in the transaction has been hardened as shown in block 750. This could be the result of an explicit harden operation or in time by associated cache lines having been evicted from the caches. If, however, the checksums are not equal, then the copy of the modified object has not been hardened, as shown in block 760. In this case, the previous sequenced copy of the modified object is evaluated to determine hardening as shown in block 770.

Since the checksum is calculated over all modified objects and metadata, including associated logs, the checksum can be used to determine whether a transaction has been hardened or not. Furthermore, the order by which the modified data or metadata reaches the persistent memory becomes irrelevant due to the checksum. In other words, the order by which corresponding cache lines may have been evicted from the cache becomes irrelevant. Therefore, it is enough to have the logs stored in persistent memory when a transaction is hardened.

Figure 8:
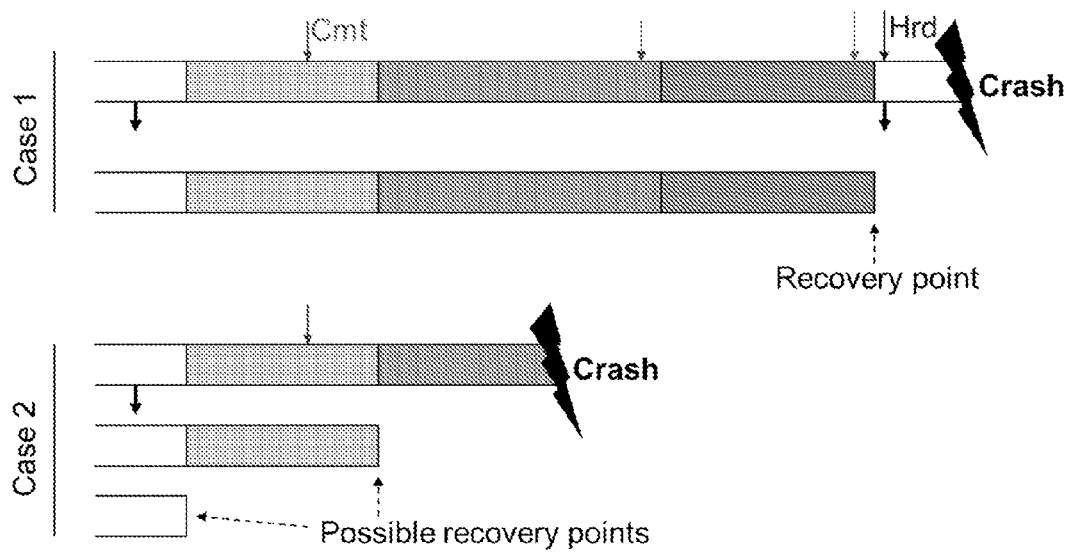
FIG. 8 depicts two cases of a system failure according to an embodiment.

FIG. 8 illustrates two examples of a system failure according to an embodiment. In case 1, data is hardened after the last commit before the failure and content up to that point is recovered as described above. In case 2, because data has not been hardened after two commits, there are two possibilities for the recovery point. Depending on how much data has reached the persistent memory before the failure, the transaction is rolled back to one of the two points shown in case 2 in FIG. 8.

Figure 9:
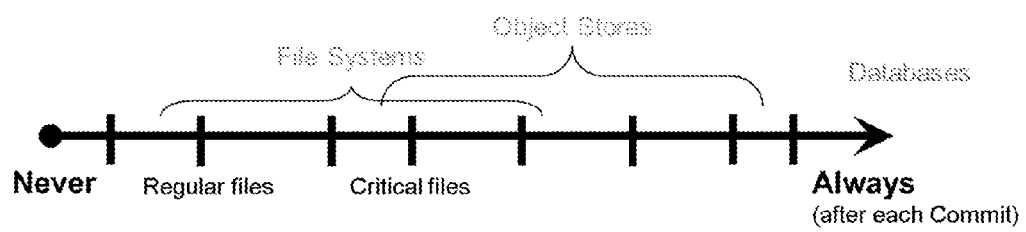
FIG. 9 depicts a preferred frequency of hardening for a range of systems and applications according to embodiments of the disclosure.

FIG. 9 illustrates that depending on the frequency of hardening transactions, embodiments of this disclosure may be used for a wide range of systems and applications. Embodiments guarantee that content in persistent memory is always consistent even after power failures. The difference between use cases is how much data loss a system can tolerate. For example, as shown in FIG. 9, databases may require that data get hardened when data is committed. On the other hand, there are cases where as long as data is kept consistent in persistent memory, some loss of data is acceptable.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for providing consistency of data stored in persistent memory, the method comprising:
    committing, by a processing device, a transaction in cache, the committing including marking an end of an atomic operation on a modified object from the transaction, creating a new copy of the modified object after a delay that corresponds to a next write operation, and storing a mapping of the modified object to the new copy of the modified object in a recorded log;
    calculating a checksum that identifies the modified object and storing the checksum in the recorded log; and
    hardening the transaction, the hardening including storing the modified object and the recorded log from the cache into persistent memory.

2. The computer-implemented method of claim 1, further comprising:
    recovering from a system failure, the recovering comprising:
    recalculating a checksum for the transaction over a copy of the modified object and its associated recorded log;
    comparing the recalculated checksum with the checksum stored in a log in persistent memory;
    determining that the transaction has been hardened in response to the recalculated checksum and the checksum in the log being equal; and
    locating an older copy of the modified object that has been hardened in response to the recalculated checksum and the checksum in the log not being equal.

3. The computer-implemented method of claim 1, wherein a sequence number is associated with each transaction and stored in the log.

4. The computer-implemented method of claim 3, wherein transactions are hardened in order of their sequence numbers.

5. The computer-implemented method of claim 3, wherein older copies of objects that have not been hardened and have smaller associated sequence numbers than objects belonging to a hardened set are discarded to reclaim cache memory.

6. The computer-implemented method of claim 1, wherein the recorded log includes a header for storing the sequence number and an identifier for the modified object, a body for storing the sequence number and a list of modified objects, and a trailer for storing the sequence number and the checksum.

7. The computer-implemented method of claim 6, wherein the log is a circular buffer including a buffer head pointer and a buffer tail pointer.

8. The computer-implemented method of claim 1, wherein the new copy is a copy of the modified object created during the next write operation after committing the transaction.

9. The computer-implemented method of claim 1, wherein the checksum is calculated during the committing of the transaction.

10. The computer-implemented method of claim 1, wherein the checksum is calculated during the hardening of the transaction.

11. The computer-implemented method of claim 1, wherein the committing of the transaction includes only the marking of the end of the atomic operation on the modified object from the transaction, and
    wherein the creating, by the processing device, of the new copy of the modified object is a separate processing from the marking after the delay that corresponds to the next write operation.

12. A computer system for providing consistency of data stored in persistent memory, the computer system comprising:
    a memory having computer readable instructions; and a processor for executing the computer readable instructions, the instructions including:
    committing, by the processor, a transaction in cache, the committing including marking an end of an atomic operation on a modified object from the transaction, creating a new copy of the modified object after a delay that corresponds to a next write operation, and storing a mapping of the modified object to the new copy of the modified object in a recorded log;
    calculating a checksum that identifies the modified object and storing the checksum in the recorded log; and
    hardening the transaction, the hardening including storing the modified object and the recorded log from the cache into persistent memory.

13. The computer system of claim 12, further comprising:
    recovering from a system failure, the recovering comprising:
    recalculating a checksum for the transaction over a copy of the modified object and its associated recorded log;
    comparing the recalculated checksum with the checksum stored in a log in persistent memory;
    determining that the transaction has been hardened in response to the recalculated checksum and the checksum in the log being equal; and
    locating an older copy of the modified object that has been hardened in response to the recalculated checksum and the checksum in the log not being equal.

14. The computer system of claim 12, wherein a sequence number is associated with each transaction and stored in the log.

15. The computer system of claim 14, wherein transactions are hardened in order of their sequence numbers.

16. The computer system of claim 14, wherein older copies of objects that have not been hardened and have smaller associated sequence numbers than objects belonging to a hardened set are discarded to reclaim cache memory.

17. The computer system of claim 12, wherein the recorded log includes a header for storing the sequence number and an identifier for the modified object, a body for storing the sequence number and a list of modified objects, and a trailer for storing the sequence number and the checksum.

18. The computer system of claim 17, wherein the log is a circular buffer including a buffer head pointer and a buffer tail pointer.

19. The computer system of claim 12, wherein the committing of the transaction includes only the marking of the end of the atomic operation on the modified object from the transaction, and
wherein the creating, by the processor, of the new copy of the modified object is a separate processing from the marking after the delay that corresponds to the next write operation.

20. A computer program product, the computer program product comprising a non-transitory computer readable storage medium having program code for providing consistency of data stored in persistent memory embodied therewith, the program code executable by a processor to cause:
committing, by the processor, a transaction in cache, the committing including marking an end of an atomic operation on a modified object from the transaction, creating a new copy of the modified object after a delay that corresponds to a next write operation, and storing a mapping of the modified object to the new copy of the modified object in a recorded log;
calculating a checksum that identifies the modified object and storing the checksum in the recorded log; and
hardening the transaction, the hardening including storing the modified object and the recorded log from the cache into persistent memory.

21. The computer program product of claim 20, further comprising:
recovering from a system failure, the recovering comprising:
recalculating a checksum for the transaction over a copy of the modified object and its associated recorded log;
comparing the recalculated checksum with the checksum stored in a log in persistent memory;
determining that the transaction has been hardened in response to the recalculated checksum and the checksum in the log being equal; and
locating an older copy of the modified object that has been hardened in response to the recalculated checksum and the checksum in the log not being equal.

22. The computer program product of claim 20, wherein the committing of the transaction includes only the marking of the end of the atomic operation on the modified object from the transaction, and
wherein the creating, by the processor, of the new copy of the modified object is a separate processing from the marking after the delay that corresponds to the next write operation.

* * * * *